United States Patent
Iwata et al.

(10) Patent No.: US 12,030,038 B2
(45) Date of Patent: Jul. 9, 2024

(54) EXHAUST GAS PURIFICATION CATALYTIC DEVICE

(71) Applicants: CATALER CORPORATION, Kakegawa (JP); TOYOTA JIDOSHA KABUSHIKI KAISHA, Toyota (JP)

(72) Inventors: Kana Iwata, Kakegawa (JP); Minoru Itou, Kakegawa (JP); Shunsuke Ohishi, Kakegawa (JP); Takeru Yoshida, Toyota (JP); Masaru Kakinohana, Toyota (JP); Satoshi Kamitani, Toyota (JP); Hiromasa Suzuki, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 17/611,390

(22) PCT Filed: May 11, 2020

(86) PCT No.: PCT/JP2020/018862
§ 371 (c)(1),
(2) Date: Nov. 15, 2021

(87) PCT Pub. No.: WO2020/230763
PCT Pub. Date: Nov. 19, 2020

(65) Prior Publication Data
US 2022/0212171 A1    Jul. 7, 2022

(30) Foreign Application Priority Data
May 15, 2019   (JP) .................................. 2019-092246

(51) Int. Cl.
*B01J 23/10* (2006.01)
*B01J 23/40* (2006.01)
(Continued)

(52) U.S. Cl.
CPC ............. *B01J 23/464* (2013.01); *B01J 23/10* (2013.01); *B01J 23/42* (2013.01); *B01J 23/44* (2013.01);
(Continued)

(58) Field of Classification Search
CPC ... B01J 23/10; B01J 23/40; B01J 23/42; B01J 23/44; B01J 23/464; B01J 35/0006; B01J 35/04; F01N 3/101; F01N 3/2803
(Continued)

(56) References Cited

U.S. PATENT DOCUMENTS 7,816,300 B2 * 10/2010 Takeuchi ............. B01J 37/0244
                                                              423/244.1
7,846,863 B2 * 12/2010 Taki ..................... B01D 53/945
                                                              502/303
(Continued)

FOREIGN PATENT DOCUMENTS

JP    2004-52575 A    2/2004
JP    2008-302304 A   12/2008
(Continued)

OTHER PUBLICATIONS

Jul. 21, 2020 Search Report issued in International Patent Application No. PCT/JP2020/018862.
(Continued)

*Primary Examiner* — Cam N. Nguyen
(74) *Attorney, Agent, or Firm* — Oliff PLC

(57) ABSTRACT

An exhaust gas purification catalytic device includes: a substrate; at least one type of noble-metal catalyst that is supported on the substrate; and a coating layer on the surface of the substrate. The substrate includes a plurality of cells which are demarcated by porous walls. The substrate and the coating layer each include ceria-zirconia composite oxide particles.

7 Claims, 5 Drawing Sheets

(51) Int. Cl.
- *B01J 23/42* (2006.01)
- *B01J 23/44* (2006.01)
- *B01J 23/46* (2006.01)
- *B01J 35/00* (2024.01)
- *B01J 35/04* (2006.01)
- *B01J 35/56* (2024.01)
- *B01J 37/02* (2006.01)
- *B01J 37/08* (2006.01)
- *F01N 3/10* (2006.01)
- *F01N 3/28* (2006.01)

(52) U.S. Cl.
CPC .............. *B01J 35/19* (2024.01); *B01J 35/56* (2024.01); *B01J 37/0225* (2013.01); *B01J 37/08* (2013.01); *F01N 3/10* (2013.01); *F01N 2570/10* (2013.01)

(58) Field of Classification Search
USPC ........ 502/258–262, 304, 325–327, 332–334, 502/339, 349, 527.12, 527.13
See application file for complete search history.

(56) References Cited

U.S. PATENT DOCUMENTS

| | | | | |
|---|---|---|---|---|
| 7,998,896 B2* | 8/2011 | Kitamura | ............. | B01J 37/0244 502/355 |
| 8,501,661 B2* | 8/2013 | Sunada | ................. | B01J 23/002 502/333 |
| 8,580,705 B2* | 11/2013 | Aoki | .................... | B01J 37/0248 502/304 |
| 9,579,633 B2* | 2/2017 | Suzuki | ............... | B01D 53/9468 |
| 9,839,902 B2* | 12/2017 | Suzuki | ................. | B01J 37/0244 |
| 9,873,085 B2* | 1/2018 | Yoshida | .................. | B01J 23/63 |
| 10,058,846 B2* | 8/2018 | Saito | ................. | B01J 35/0006 |
| 10,143,968 B2* | 12/2018 | Suzuki | ................. | B01J 35/0006 |
| 10,307,736 B2* | 6/2019 | Saito | ...................... | B01J 21/066 |
| 10,413,885 B2* | 9/2019 | Suzuki | ..................... | B01J 35/04 |
| 10,556,223 B2* | 2/2020 | Suzuki | ................... | B01J 37/031 |
| 10,576,420 B2* | 3/2020 | Chinzei | ................. | B01J 37/009 |
| 10,603,658 B1* | 3/2020 | Makino | .................. | B01J 21/04 |
| 10,626,765 B2* | 4/2020 | Inoda | .................. | F01N 3/0222 |
| 10,731,532 B2* | 8/2020 | Suzuki | .................... | F01N 3/101 |
| 10,953,395 B2* | 3/2021 | Goto | ................... | C04B 38/0645 |
| 10,989,092 B2* | 4/2021 | Yamamoto | ............ | F01N 3/0211 |
| 11,053,833 B2* | 7/2021 | Chinzei | .................... | B01J 23/63 |
| 11,224,840 B2* | 1/2022 | Suzuki | ..................... | F01N 3/101 |
| 11,286,830 B2* | 3/2022 | Saito | ................... | B01J 37/0244 |
| 11,298,685 B2* | 4/2022 | Goto | .................. | B01D 53/9468 |
| 11,298,686 B2* | 4/2022 | Goto | ..................... | F01N 3/2828 |
| 11,298,687 B2* | 4/2022 | Goto | ........................ | B01J 23/44 |
| 11,364,489 B2* | 6/2022 | Makino | ................ | B01J 35/0006 |
| 11,504,700 B2* | 11/2022 | Oishi | ..................... | B01J 27/053 |
| 11,618,009 B2* | 4/2023 | Goto | ......................... | F01N 3/28 502/304 |
| 2008/0081761 A1* | 4/2008 | Suzuki | ................. | B01J 35/0006 502/339 |
| 2011/0094207 A1 | 4/2011 | Woerz et al. | | |
| 2011/0237428 A1* | 9/2011 | Itou | .................... | B01D 53/9472 502/305 |
| 2012/0021896 A1 | 1/2012 | Nakano et al. | | |
| 2016/0288096 A1* | 10/2016 | Fujiwara | ................. | B01J 23/63 |
| 2018/0229183 A1 | 8/2018 | Kadota et al. | | |
| 2019/0143312 A1* | 5/2019 | Goto | .................... | C04B 35/6303 502/304 |
| 2020/0222882 A1 | 7/2020 | Goto et al. | | |
| 2020/0222884 A1 | 7/2020 | Goto et al. | | |
| 2020/0222889 A1 | 7/2020 | Goto et al. | | |
| 2020/0340383 A1* | 10/2020 | Tojo | ..................... | B01J 37/0225 |

FOREIGN PATENT DOCUMENTS

| | | |
|---|---|---|
| JP | 2015-77543 A | 4/2015 |
| JP | 2015-85241 A | 5/2015 |
| JP | 2015-188881 A | 11/2015 |
| JP | 2017-39069 A | 2/2017 |
| JP | 2018-532573 A | 11/2018 |
| JP | 2019-58872 A | 4/2019 |
| JP | 2019-58875 A | 4/2019 |
| WO | 2010/114132 A1 | 10/2010 |
| WO | 2017/034920 A1 | 3/2017 |
| WO | 2019/065798 A1 | 4/2019 |

OTHER PUBLICATIONS

Jul. 21, 2020 Written Opinion issued in International Patent Application No. PCT/JP2020/018862.
Nov. 16, 2021 International Preliminary Report on Patentability issued in International Patent Application No. PCT/JP2020/018862.
Nov. 30, 2022 Extended European Search Report issued in European Patent Application No. 20805060.9.

* cited by examiner (a) Comparative Example 1

(b) Example 1

(c) Example 2

EXHAUST GAS PURIFICATION CATALYTIC DEVICE

FIELD

The present invention relates to an exhaust gas purification catalytic device.

BACKGROUND

Generally, in an exhaust gas purification catalytic device, a catalytic coating layer is formed on a honeycomb substrate composed of, for example, cordierite. The catalytic coating layer contains carrier particles, noble metal catalyst particles supported on the carrier particles, and cocatalyst particles. The use of a ceria-zirconia composite oxide having an oxygen storage capacity (OSC ability) as one of the cocatalyst particles is well known. The ceria-zirconia composite oxide has a function of absorbing and releasing oxygen in response to the environment (oxygen concentration) in an inflowing exhaust gas, mitigating changes in the exhaust gas environment to promote exhaust gas purification by the exhaust gas purification catalytic device.

Recently, the use of ceria-zirconia composite oxide particles as cocatalyst particles, not arranged in the catalytic coating layer but as one of the constituent materials of a honeycomb substrate, has been investigated. For example, PTL 1 discloses an exhaust gas purification catalytic device in which a honeycomb substrate contains ceria-zirconia composite oxide particles. In this exhaust gas purification catalytic device, a catalytic coating layer is not present, and noble metal catalyst particles are supported directly on the honeycomb substrate by impregnating the honeycomb substrate with a solution containing a noble metal.

PTL 2 also discloses such a honeycomb substrate, and an exhaust gas purification catalytic device using the same.

As general coating methods for forming a catalytic coating layer on a honeycomb substrate composed of, for example, cordierite, the methods described in PTL 3 and 4 are well known.

CITATION LIST

Patent Literature

[PTL 1] Japanese Unexamined Patent Publication (Kokai) No. 2015-85241
[PTL 2] Japanese Unexamined Patent Publication (Kokai) No. 2015-77543
[PTL 3] Japanese Unexamined Patent Publication (Kokai) No. 2008-302304
[PTL 4] WO 2010/114132

SUMMARY

Technical Problem

The exhaust gas purification catalytic devices disclosed in PTL 1 and 2 have a small heat capacity due to the absence of a catalytic coating layer, and the temperature of the honeycomb substrate can be raised easily. Thus, a high warm-up performance can be obtained. Since the substrate contains ceria-zirconia composite oxide particles, it is expected that the substrate itself exhibits OSC ability.

However, from the investigations by the present inventors, it became clear that the desired OSC ability may not be exhibited in these exhaust gas purification catalytic devices.

The present invention has been made in view of the above circumstances. The object of the present invention is to provide an exhaust gas purification catalytic device that is capable of exhibiting a high OSC ability and preferably provided with a high warm-up performance.

Solution to Problem

The present invention is described as follows.

<<Aspect 1>> An exhaust gas purification catalytic device, comprising
  a substrate,
  one or more catalytic noble metals supported on the substrate, and
  a coating layer on a surface of the substrate, wherein
  the substrate comprises a plurality of cells partitioned by a porous wall, and
  the substrate and the coating layer each contain ceria-zirconia composite oxide particles.

<<Aspect 2>> The exhaust gas purification catalytic device according to Aspect 1, wherein the plurality of cells in the substrate penetrate from an upstream end to a downstream end of an exhaust gas flow.

<<Aspect 3>> The exhaust gas purification catalytic device according to Aspect 2, wherein the coating layer is present in a length of 80% or less of a substrate length from a downstream end of an exhaust gas flow of the substrate.

<<Aspect 4>> The exhaust gas purification catalytic device according to Aspect 1, wherein the plurality of cells in the substrate comprise
  an inlet side cell, which is opened on an upstream end of an exhaust gas flow and sealed on a downstream end thereof; and
  an outlet side cell, which is sealed on the upstream end of the exhaust gas flow and opened on the downstream end thereof, and
  are thereby configured to allow an exhaust gas flowed into the inlet side cell to pass through the porous wall and discharge from the outlet side cell.

<<Aspect 5>> The exhaust gas purification catalytic device according to Aspect 4, wherein the coating layer is present on a surface of the inlet side cell of the substrate.

<<Aspect 6>> The exhaust gas purification catalytic device according to any one of Aspects 1 to 5, wherein a coating amount of the coating layer per L capacity of a portion of the substrate corresponding to a region having the coating layer is 400 g/L or less.

<<Aspect 7>> The exhaust gas purification catalytic device according to any one of Aspects 1 to 6, wherein the coating layer contains a catalytic noble metal.

<<Aspect 8>> The exhaust gas purification catalytic device according to Aspect 7, wherein the catalytic noble metal contained in the coating layer and the catalytic noble metal supported on the substrate are different catalytic noble metals.

<<Aspect 9>> The exhaust gas purification catalytic device according to Aspect 8, wherein the catalytic noble metal contained in the coating layer is rhodium and the catalytic noble metal supported on the substrate is one or more selected from platinum and palladium.

<<Aspect 10>> The exhaust gas purification catalytic device according to any one of Aspects 1 to 9, wherein for a specific noble metal, which is one of the catalytic noble metals supported on the substrate, a depth of supporting 50% by mass of a noble metal is less than 50% of a distance from a surface of the porous wall to a center within the porous wall, wherein the depth of supporting 50% by mass of the noble metal is a depth at which 50% by mass of the specific noble metal is supported, based on an amount of the specific noble metal supported from the surface of the porous wall to the center within the porous wall.

Advantageous Effects of Invention

The exhaust gas purification catalytic device of the present invention can reliably exhibit the desired OSC ability. In the preferred embodiment of the present invention, the desired OSC ability is exhibited and a high degree of warm-up performance is provided.

BRIEF DESCRIPTION OF DRAWINGS

FIG. 5(a) is a graph for the $CO_2$ emission of the entire exhaust gas purification catalytic device; FIG. 5(b) is a graph showing the $CO_2$ emissions of the exhaust gas purification catalytic device separated by the contribution of the substrate and the contribution of the coating layer.

FIG. 6(a) is a graph for the $CO_2$ emission of the entire exhaust gas purification catalytic device; FIG. 6(b) is a graph showing the $CO_2$ emissions of the exhaust gas purification catalytic device separated by the contribution of the substrate and the contribution of the coating layer.

DESCRIPTION OF EMBODIMENTS

Figure 1:
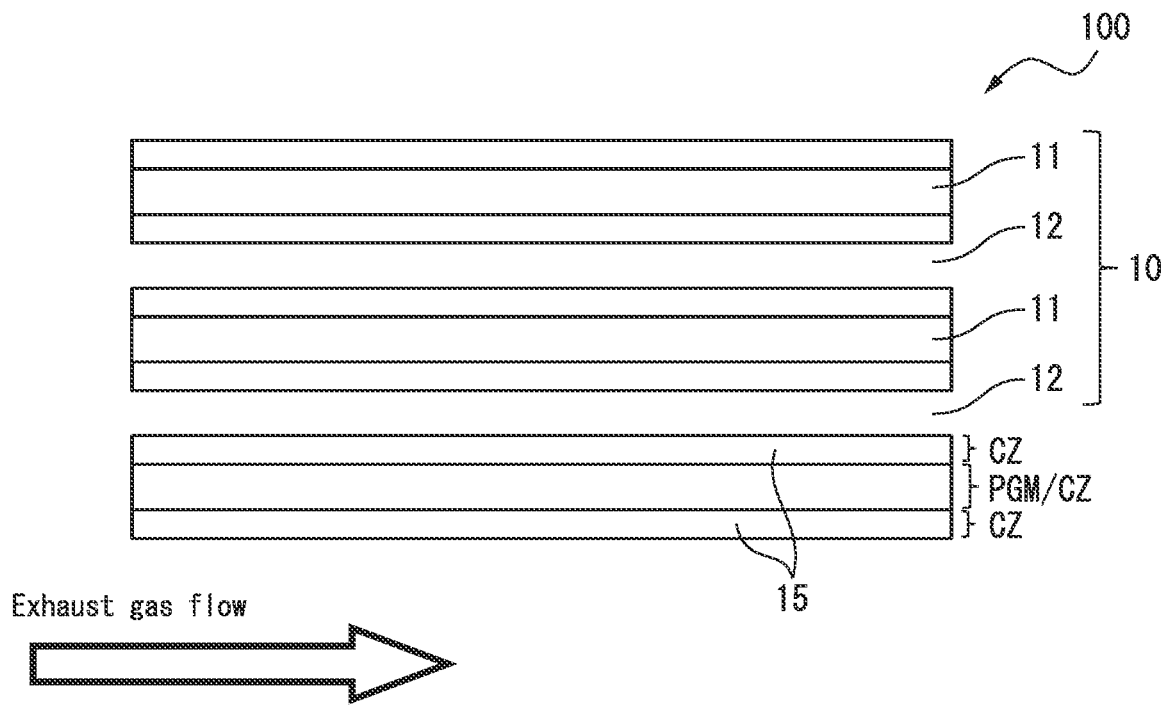
FIG. 1 is a schematic cross-sectional view for describing one example of the structure of the exhaust gas purification catalytic device of the present invention.

The exhaust gas purification catalytic device of the present invention comprises
a substrate,
a catalytic noble metal supported on the substrate, and
a coating layer on the substrate surface, wherein
the substrate comprises a plurality of cells partitioned by a porous wall, and
the substrate and the coating layer each contain ceria-zirconia composite oxide particles.

The present inventors investigated why a substrate in an exhaust gas purification catalytic device sometimes fails to exhibit the desired OSC ability when ceria-zirconia composite oxide particles are used as one of the constituent materials of the substrate. As a result, the present inventors arrived at the idea that in such an exhaust gas purification catalytic device, the OSC ability originally present in the ceria-zirconia composite oxide particles is not reduced, but rather the response of oxygen absorption and release may be slow when the environment (oxygen concentration) of exhaust gas flowing into the device changes. According to this idea, the substrate has a slower rate of oxygen adsorption and release, but the amounts of oxygen occluded and released are not impaired, thus the potential OSC ability is maintained.

It is presumed that the slow response of oxygen adsorption and release is caused by one or more of a reduction of specific surface area, a change in crystal structure, and solid solution with another constituent material due to sintering of the constituent materials of the substrate at high temperature during substrate manufacturing.

The exhaust gas purification catalytic device of the present invention is an exhaust gas purification catalytic device that uses ceria-zirconia composite oxide particles as one of the constituent materials of the substrate, wherein a coating layer containing ceria-zirconia composite oxide particles is provided on the substrate surface to assist the OSC ability of the substrate itself.

According to this configuration, the ceria-zirconia composite oxide particles in the coating layer respond immediately to absorb or release oxygen when the environment of the exhaust gas flowing into the exhaust gas purification catalytic device changes. If this environment is sustained, the potential OSC ability by the ceria-zirconia composite oxide particles in the substrate functions to absorb an excessive amount of oxygen for exhaust gas purification or release a necessary amount of oxygen for exhaust gas purification, and thus the exhaust gas purification of the exhaust gas purification catalytic device is promoted.

Hereinafter, the elements constituting the exhaust gas purification catalytic device of the present invention will be detailed in order.

<Substrate>

The substrate in the exhaust gas purification catalytic device of the present invention comprises a plurality of cells partitioned by a porous wall and contains ceria-zirconia composite oxide particles.

The substrate in the exhaust gas purification catalytic device of the present invention comprises a plurality of cells partitioned by a porous wall. The substrate may be a straight flow-type honeycomb substrate in which the plurality of cells penetrate from an upstream end to a downstream end of an exhaust gas flow in the length direction of the substrate, or may be a wall flow-type honeycomb substrate in which the plurality of cells comprise an inlet side cell, which is opened on the upstream end of the exhaust gas flow and sealed on the downstream end thereof; and an outlet side cell, which is sealed on the upstream end of the exhaust gas flow and opened on the downstream end thereof, and by this configuration, are configured to allow an exhaust gas flowed into the inlet side cell to pass through the porous wall and discharge from the outlet side cell.

The substrate may contain ceria-zirconia composite oxide particles. The ceria-zirconia composite oxide particles may be particles of a solid solution of ceria and zirconia. In addition to ceria and zirconia, a rare earth element (for example, lanthanum (La) or yttrium (Y)) may be further dissolved as a solid in the solid solution.

The substrate may consist of only ceria-zirconia composite oxide particles. Other than the ceria-zirconia composite oxide particles, an additional component may be contained. The additional component may be, for example, inorganic oxide particles other than the ceria-zirconia composite oxide particles or a binder.

The inorganic oxide particles other than the ceria-zirconia composite oxide particles may be oxide particles comprising one or more elements selected from, for example, aluminum, silicon, zirconium, titanium, and tungsten, particularly alumina particles.

The binder may be an inorganic binder, for example, alumina sol or titania sol.

The ratio of the ceria-zirconia composite oxide particles contained in the substrate, as a ratio of the mass of the ceria-zirconia composite oxide particles relative to the total mass of the substrate, may be, for example, 20% by mass or greater, 30% by mass or greater, 40% by mass or greater, 50% by mass or greater, 60% by mass or greater, or 70% by mass or greater, and may be 95% by mass or less, 90% by mass or less, 80% by mass or less, 70% by mass or less, 60% by mass or less, 50% by mass or less, or 40% by mass or less.

The capacity of the substrate may be appropriately set according to the displacement of the internal combustion engine for the expected application. The capacity of the substrate may be, for example, 500 mL or greater, 600 mL or greater, 800 mL or greater, 1,000 mL or greater, or 1,500 mL or greater, and may be, for example, 3,000 mL or less, 2,500 mL or less, 2,000 mL or less, 1,500 mL or less, or 1,200 mL or less.

<Catalytic Noble Metal>

The exhaust gas purification catalytic device of the present invention comprises one or more catalytic noble metals supported on a substrate.

The catalytic noble metals may be, for example, a platinum group noble metal, particularly one, two, or three selected from platinum, palladium, and rhodium.

In the exhaust gas purification catalytic device of the present invention, when the catalytic noble metals include platinum, the amount of platinum in terms of the mass of metallic platinum per L of substrate capacity may be, for example, 0.01 g/L or greater, 0.02 g/L or greater, 0.05 g/L or greater, 0.07 g/L or greater, or 0.08 g/L, and may be, for example, 1.0 g/L or less, 0.8 g/L or less, 0.6 g/L or less, 0.4 g/L or less, or 0.2 g/L or less.

When the catalytic noble metals include palladium, the amount of palladium in terms of the mass of metallic palladium per L of substrate capacity, may be, for example, 0.5 g/L or greater, 1.0 g/L or greater, 1.5 g/L or greater, 2.0 g/L or greater, 2.5 g/L or greater, or 3.0 g/L or greater, and may be, for example, 10.0 g/L or less, 8.0 g/L or less, 6.0 g/L or less, 5.0 g/L or less, or 4.0 g/L or less.

When the catalytic noble metals include rhodium, the amount of rhodium in terms of the mass of metallic rhodium per L of substrate capacity may be, for example, 0.01 g/L or greater, 0.05 g/L or greater, 0.10 g/L or greater, or 0.15 g/L or greater, and may be, for example, 0.50 g/L or less, 0.40 g/L or less, 0.35 g/L or less, or 0.30 g/L or less.

In the exhaust gas purification catalytic device of the present invention, the catalytic noble metals may include platinum or palladium, or may include platinum or palladium with rhodium.

In the exhaust gas purification catalytic device of the present invention, the catalytic noble metals may be supported uniformly in the thickness direction of the porous wall of the substrate. However, for a specific noble metal, which is one of the catalytic noble metals, the depth of supporting 50% by mass of the noble metal may be less than 50% of the distance from the surface of the porous wall to the center within the porous wall. The depth of supporting 50% by mass of the noble metal is a depth at which 50% by mass of the specific noble metal is supported, based on the amount of the specific noble metal supported from the surface of the porous wall to the center within the porous wall. The depth of supporting 50% by mass of the noble metal may be measured by electron probe microanalyzer (EPMA) analysis.

This requirement shows that at least one of the catalytic noble metals is supported by localizing near the surface of the porous wall of the substrate. According to this requirement, it is expected that the specific noble metal be easily brought into contact with the exhaust gas flowing into the exhaust gas flowing into the exhaust gas purification catalytic device of the present invention, and the exhaust gas purification efficiency by the specific noble metal is improved.

From the viewpoint of having more of the specific noble metal localized near the surface of the porous wall and increasing the exhaust gas purification efficiency by the specific noble metal, it is considered that the shallower the depth of supporting 50% by mass of the noble metal is, the better. However, from the viewpoint of having the specific noble metal benefiting from the OSC ability of the ceria-zirconia composite oxide particles present within the porous wall, it is not preferable that the depth of supporting 50% by mass of the noble metal be excessively shallow.

Therefore, for the specific noble metal, the depth of supporting 50% by mass of the noble metal should be set within a range in which the above requirement is well balanced. From this viewpoint, for the specific noble metal, the depth of supporting 50% by mass of the noble metal is 12% or greater of the distance from the surface of the porous wall to the center within the porous wall, or may be, for example, 14% or greater, 16% or greater, 17% or greater, 18% or greater, or 20% or greater, and may be 40% or less, 35% or less, 30% or less, 25% or less, or 20% or less thereof.

The specific noble metal may be platinum, palladium, or rhodium, and may further be platinum or palladium. In the exhaust gas purification catalytic device of the present invention, the specific noble metal is particularly preferably platinum or palladium, and the catalytic noble metals other than the specific noble metal may include rhodium.

<Coating Layer>

The exhaust gas purification catalytic layer of the present invention comprises a coating layer on the substrate surface. This coating layer contains ceria-zirconia composite oxide particles.

According to a preferred embodiment of the present invention, the coating layer of the exhaust gas purification catalytic device of the present invention may be formed without undergoing a sintering process by high-temperature baking. Specifically, this coating layer may be formed without undergoing a heat treatment at a temperature of, for example, greater than 900° C., greater than 800° C., greater than 700° C., or greater than 600° C. Such a coating layer has a function of assisting the OSC ability of the substrate by quickly absorbing and releasing oxygen when the environment (oxygen concentration) of exhaust gas flowing into the device changes.

In order to assist the OSC ability of the substrate, the coating layer contains ceria-zirconia composite oxide particles. For these ceria-zirconia composite oxide particles, the ceria-zirconia composite oxide particles contained in the substrate as described above can be used as-is.

The coating layer may consist of only ceria-zirconia composite oxide particles. An additional component may be contained. The additional component may be, for example, inorganic oxide particles other than the ceria-zirconia composite oxide particles, a catalytic noble metal, or a binder.

The inorganic oxide particles other than the ceria-zirconia composite oxide particles may be oxide particles comprising one or more elements selected from, for example, aluminum, silicon, zirconium, titanium, and tungsten, particularly alumina particles.

The coating layer may contain a catalytic noble metal. The catalytic noble metal may be, for example, a platinum group noble metal, particularly one, two, or three selected from platinum, palladium, and rhodium.

When the coating layer contains platinum, the amount of platinum in terms of the mass of metallic platinum per L capacity of a portion of the substrate corresponding to a region having the coating layer may be, for example, 0.01 g/L or greater, 0.02 g/L or greater, 0.05 g/L or greater, 0.07 g/L or greater, or 0.08 g/L, and may be, for example, 1.0 g/L or less, 0.8 g/L or less, 0.6 g/L or less, 0.4 g/L or less, or 0.2 g/L or less.

When the coating layer contains palladium, the amount of palladium in terms of the mass of metallic palladium per L capacity of a portion of the substrate corresponding to a region having the coating layer may be, for example, 0.5 g/L or greater, 1.0 g/L or greater, 1.5 g/L or greater, 2.0 g/L or greater, 2.5 g/L or greater, or 3.0 g/L or greater, and may be, for example, 10.0 g/L or less, 8.0 g/L or less, 6.0 g/L or less, 5.0 g/L or less, or 4.0 g/L or less.

When the coating layer contains rhodium, the amount of rhodium in terms of the mass of metallic rhodium per L capacity of a portion of the substrate corresponding to a region having the coating layer may be, for example, 0.01 g/L or greater, 0.05 g/L or greater, 0.10 g/L or greater, or 0.15 g/L or greater, and may be, for example, 0.50 g/L or less, 0.40 g/L or less, 0.35 g/L or less, or 0.30 g/L or less.

The catalytic noble metal contained in the coating layer may be the same as the catalytic noble metal supported on the substrate or may be different therefrom. An example thereof can be the case where the catalytic noble metal contained in the coating layer is rhodium and the catalytic noble metal supported on the substrate is one or more selected from platinum and palladium.

The catalytic noble metal contained in the coating layer may be supported by one or more selected from ceria-zirconia composite oxide particles and inorganic oxide particles other than the ceria-zirconia composite oxide particles.

The binder contained in the coating layer may be an inorganic binder, for example, alumina sol or titania sol.

The ratio of the ceria-zirconia composite oxide particles contained in the substrate, as a ratio of the mass of the ceria-zirconia composite oxide particles relative to the total mass of the substrate, may be, for example, 20% by mass or greater, 30% by mass or greater, 40% by mass or greater, 50% by mass or greater, 60% by mass or greater, or 70% by mass or greater, and may be, for example, 100% by mass or less, 95% by mass or less, 90% by mass or less, 80% by mass or less, 70% by mass or less, 60% by mass or less, 50% by mass or less, or 40% by mass or less.

The composition of the coating layer may be the same as the composition of the substrate, or may be different therefrom.

The phrase "coating layer on a substrate surface" refers to a concept which encompasses both the case where the coating layer is present on a substrate surface and the case where the coating layer is present within a substrate. In other words, the coating layer may be present on the substrate surface without infiltrating the porous wall of the substrate, may infiltrate into the porous wall of the substrate and be present within the substrate, or may be present both on the substrate surface and within the substrate. Further, there may be a plurality of coating layers. The plurality of coating layers may be layered at the same site on the substrate or may be present at different sites on the substrate.

In order to not inhibit the high warm-up performance of the substrate as much as possible, it is preferable that the amount and length of the coating layer be limited to the necessary minimum and that at least a portion of the substrate not comprise a coating layer.

From this viewpoint, in the case of a straight flow-type substrate, it is preferable that in the substrate, a coating layer not be provided on the upstream side of the exhaust gas flow that is initially brought into contact with a high-temperature exhaust gas, whereby the warm-up ability of the exhaust gas purification catalytic device is ensured, and a coating layer be present on the downstream side where the OSC ability is assisted by the coating layer, thereby achieving a highly efficient exhaust gas purification.

The coating layer in this case may be present in a length of, for example, 80% or less, 70% or less, 60% or less, 50% or less, or 40% or less of the substrate length from the downstream end of the exhaust gas flow of the substrate. However, to effectively exhibit the effect of the coating layer, the coating layer may be present in a length of, for example, 10% or greater, 20% or greater, 30% or greater, 40% or greater, or 50% or greater of the substrate length from the downstream end of the exhaust gas flow of the substrate.

The coating layer on the downstream side of a straight flow-type substrate may be present on the substrate or within the substrate.

In the case of a wall flow-type substrate, it is more efficient to have a coating layer present on the surface of an inlet side cell in the substrate, where the probability of contact with an inflowing exhaust gas is high. The coating layer in this case may be present in a length of, for example, 90% or less, 80% or less, 70% or less, 60% or less, or 50% or less, and may be present in a length of, for example, 40% or greater, 45% or greater, 50% or greater, 55% or greater, or 60% or greater of the substrate length from the upstream end of the exhaust gas flow of the substrate.

The coating layer on the inlet side cell of a wall flow-type substrate may be present on the substrate or within the substrate.

From the viewpoint of not impairing the warm-up ability of the substrate as much as possible, the coating amount of the coating layer per L capacity of a portion of the substrate corresponding to a region having the coating layer may be 400 g/L or less, 350 g/L or less, 300 g/L or less, 250 g/L or less, or 200 g/L or less. From the viewpoint of effectively benefiting from the effect of the coating layer, the coating amount of the coating layer per L capacity of a portion of the substrate corresponding to a region having the coating layer may be 50 g/L or greater, 75 g/L or greater, 100 g/L or greater, 125 g/L or greater, 150 g/L or greater, or 175 g/L or greater.

<Embodiment of Exhaust Gas Purification Catalytic Device>

Hereinafter, the exhaust gas purification catalytic device of the present invention will be described with reference to the drawings. However, the exhaust gas purification catalytic device of the present invention is not limited to the embodiments described below.

FIG. 1 is a schematic cross-sectional view for describing one example of the structure of the exhaust gas purification catalytic device of the present invention.

The exhaust gas purification catalytic device (100) in FIG. 1 comprises a substrate (10) and a coating layer (15) on the substrate (10) surface. The substrate (10) comprises cells

(12) partitioned by a porous wall (11) and contains ceria-zirconia composite oxide particles (CZ).

The substrate (10) is a straight flow-type honeycomb substrate in which cells (12) penetrate from an upstream end to a downstream end of an exhaust gas flow in the length direction of the substrate (10). A catalytic noble metal (PGM) is supported uniformly in the thickness direction in the porous wall (11) of the substrate (10)

The coating layer (15) of the exhaust gas purification catalytic device (100) is formed on the surface of the porous wall (11) of the substrate (10) and has the same length as the substrate (10) from the upstream end of the exhaust gas flow of the substrate (10). The coating layer (15) contains ceria-zirconia composite oxide particles (CZ) and may further contain a catalytic noble metal (PGM).

Figure 2:
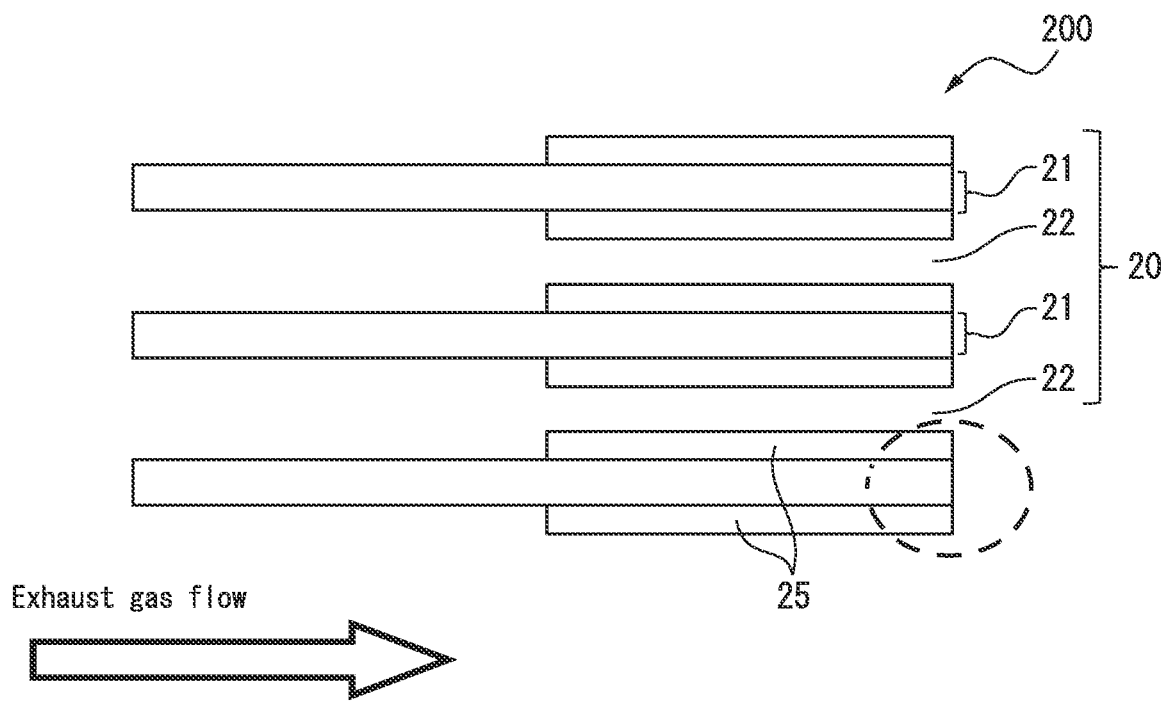
FIG. 2 is a schematic cross-sectional view for describing another example of the structure of the exhaust gas purification catalytic device of the present invention.
Figure 3:
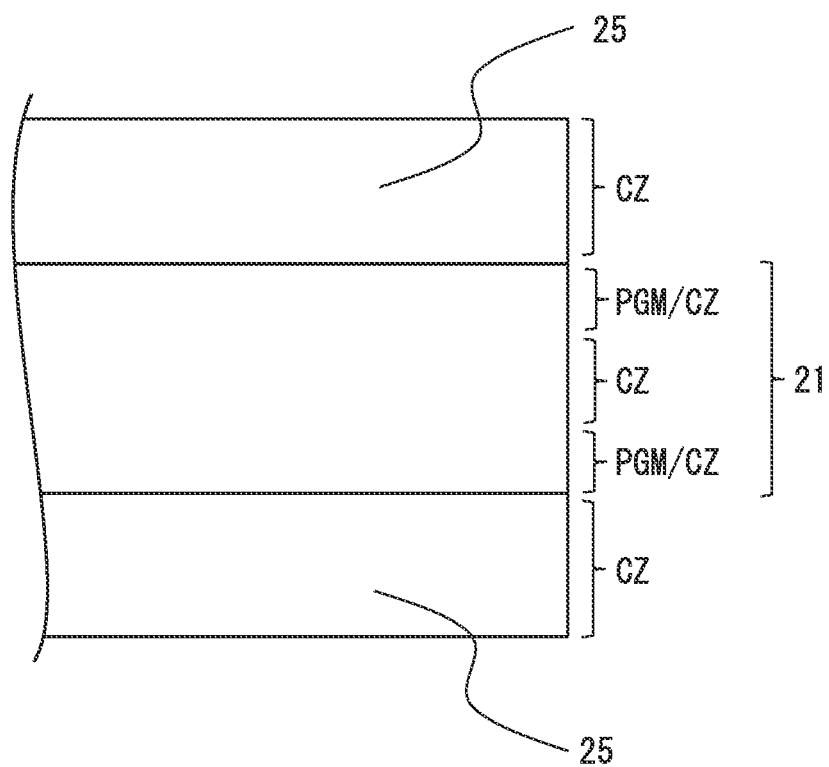
FIG. 3 is an enlarged view of the portion surrounded by the dashed line in FIG. 2.

FIG. 2 is a schematic cross-sectional view for describing another example of the structure of the exhaust gas purification catalytic device of the present invention. FIG. 3 is an enlarged view of the portion surrounded by the dashed line in FIG. 2.

The exhaust gas purification catalytic device (200) in FIG. 2 comprises a substrate (20) and a coating layer (25) on the substrate (20) surface. The substrate (20) of the exhaust gas purification catalytic device (200) of FIG. 2, like the exhaust gas purification catalytic device (100) of FIG. 1, comprises cells (22) partitioned by a porous wall (21), contains ceria-zirconia composite oxide particles (CZ), and is a straight flow-type honeycomb substrate in which the cells (12) penetrate from an upstream end to a downstream end of an exhaust gas flow in the length direction of the substrate (20).

However, as indicated in FIG. 3, in the exhaust gas purification catalytic device (200), the catalytic noble metal (PGM) is supported by localizing near the surface of the porous wall (21) of the substrate (20).

The coating layer (25) of the exhaust gas purification catalytic device (200) is formed on the surface of the porous wall (21) of the substrate (20) and has about half the length of the substrate (20) from the downstream end of the exhaust gas flow of the substrate (20). The coating layer (25) contains ceria-zirconia composite oxide particles (CZ) and may further contain a catalytic noble metal (PGM).

<<Method for Manufacturing Exhaust Gas Purification Catalytic Device>>

The exhaust gas purification catalytic device of the present invention may be manufactured by, for example, a method for manufacturing an exhaust gas purification catalytic device which comprises
 a substrate,
 one or more catalytic noble metals supported on the substrate, and
 a coating layer on the substrate surface,
 the substrate
  comprising a plurality of cells partitioned by a porous wall and
  containing ceria-zirconia composite oxide particles,
 wherein the method (first manufacturing method), using the substrate, comprises the following steps (1) and (2) to be carried out in this order.
(1) Supporting a catalytic noble metal on a substrate, and
(2) forming a coating layer on the substrate surface after supporting the catalytic noble metal.

The substrate may be appropriately selected according to the substrate in the desired exhaust gas purification catalytic device and used. Thus, the substrate may be a straight flow-type or wall flow-type substrate comprising a plurality of cells partitioned by a porous wall and containing ceria-zirconia composite oxide particles.

A catalytic noble metal is supported on the substrate in step (1). A method for supporting the catalytic noble metal relatively uniformly in the thickness direction of the porous wall of the substrate and a method for supporting the catalytic noble metal by localizing near the surface of the substrate will be described in order.

Supporting the catalytic noble metal relatively uniformly in the thickness direction of the porous wall of the substrate may be carried out by, for example, a method of immersing the substrate in a coating liquid for supporting the catalytic noble metal which contains a precursor of the catalytic noble metal, followed by baking. According to this method, the precursor of the catalytic noble metal is permeated into the substrate porous wall and baked at the permeation site to be converted into the catalytic noble metal, and thus the catalytic noble metal is supported over a wide range of depths within the porous wall of the substrate.

The coating liquid for supporting a catalytic noble metal may be, for example, an aqueous solution, containing at least a precursor of the catalytic noble metal. The coating liquid for supporting the catalytic noble metal may further contain a thickener, as needed. The coating liquid for supporting the catalytic noble metal may not contain inorganic oxide carrier particles.

The precursor of a catalytic noble metal may be, for example, a strong acid salt of the catalytic noble metal, particularly a nitrate or a sulfate of the catalytic noble metal.

As the thickener, the same thickener as the one contained in the coating liquid for surface-localizing a catalytic noble metal described below may be used after appropriately adjusting the content.

The degree in which a precursor of a catalytic noble metal permeates into the porous wall of the substrate can be adjusted by appropriately changing the immersion conditions. Examples of immersion conditions include the viscosity and temperature of the coating liquid, the immersion time, and the immersion pressure.

After immersing the substrate in the coating liquid for supporting the catalytic noble metal, the precursor of the catalytic noble metal is converted into the catalytic noble metal to be supported by baking.

In order to remove excess coating liquid from the substrate, operations such as blowing with compressed gas (compressed air), vacuum suction, or centrifugal removal, may be carried out after immersing and before baking. The substrate may also be dried. These operations may be carried out according to a standard method. Baking may be carried out under the appropriate conditions, for example, 400° C. to 1,000° C. and 30 min to 12 h.

Supporting a catalytic noble metal by localizing near the surface of the substrate may be carried out by, for example, a method in which the substrate is coated with a coating liquid for surface-localizing the catalytic noble metal, containing a precursor of a specific noble metal, which is one of the catalytic noble metals, and a thickener, followed by baking. According to this method, the permeation of the precursor of the catalytic noble metal into the porous wall of the substrate remains near the surface of the porous wall and is baked at the permeation site to be converted into the catalytic noble metal, and thus the catalytic noble metal is supported near the surface of the porous wall of the substrate.

The coating liquid for surface-localizing a catalytic noble metal may be, for example, an aqueous solution, comprising at least a precursor of the catalytic noble metal and a thickener. The coating liquid for surface-localizing the catalytic noble metal may not contain inorganic oxide carrier particles.

The precursor of a catalytic noble metal contained in the coating liquid for surface-localizing the catalytic noble metal may be appropriately selected for use from the ones described above as a precursor contained in the coating liquid for supporting the catalytic noble metal.

The thickener may be, for example, a water-soluble polymer, a cellulose derivative, or a polysaccharide. The water-soluble polymer may be, for example, polyvinyl alcohol, ethylene glycol, or propylene glycol. The cellulose derivative may be, for example, hydroxyethyl cellulose, carboxymethyl cellulose, or methyl cellulose. The polysaccharide may be, for example, pectin, xanthan gum, or guar gum.

The viscosity of the coating liquid for surface-localizing the catalytic noble metal is improved due to the blending of the thickener, and the degree of infiltration into the porous wall when coated on the substrate is adjusted, whereby, for the catalytic noble metal, a desired depth of supporting 50% by mass of the noble metal can be achieved.

The viscosity of the coating liquid for surface-localizing the catalytic noble metal at a shear rate of 380 $s^{-1}$ may be, for example, 10 mPa or greater, 50 mPa or greater, or 100 mPa or greater, and may be, for example, 400 mPa or less, 300 mPa or less, or 200 mPa or less. The viscosity of the coating liquid at a shear rate of 380 $s^{-1}$ may be measured using a commercially available cone plate-type viscometer (for example, model name "TV-33 viscometer" manufactured by Told Sangyo Co., Ltd.), using a 1° 34'×R24 conical flat plate-type cone while changing the rotation speed in the range of 1 to 100 rpm, at 25° C.

The coating liquid for surface-localizing a catalytic noble metal may be coated onto the substrate by, for example, any of the following methods:
- providing a coating liquid for surface-localizing a catalytic noble metal from one of the opening sides of the substrate, followed by
- suctioning the provided coating liquid for surface-localizing the catalytic noble metal from a substrate opening side opposite to the coating liquid providing side (first coating method), or
- providing a coating liquid for surface-localizing a catalytic noble metal from one of the opening sides of the substrate, followed by
- pumping the provided coating liquid for surface-localizing the catalytic noble metal from a substrate opening side of the coating liquid providing side (second coating method).

After coating the substrate with the coating liquid for surface-localizing the catalytic noble metal, the precursor of the catalytic noble metal is converted into the catalytic noble metal to be supported by baking. After coating and before baking, the coating liquid may be removed and the substrate may be dried. These operations may be carried out in the same manner as in the case of supporting the catalytic noble metal uniformly in the thickness direction of the porous wall of the substrate.

A coating layer is formed in step (2) on the substrate surface after supporting the catalytic noble metal as described above.

The formation of the coating layer in step (2) may be carried out by, for example, a method of coating the substrate with a coating liquid for forming a coating layer followed by baking.

The coating liquid for forming the coating layer, for example, contains at least ceria-zirconia composite oxide particles, and may further contain, for example, inorganic oxide particles other than the ceria-zirconia composite oxide particles, a thickener, a binder, or a precursor of a catalytic noble metal according to the process of the target exhaust gas purification catalytic device.

For the ceria-zirconia composite oxide particles and the inorganic oxide particles other than the ceria-zirconia composite oxide particles contained in the coating liquid for forming the coating layer, the ceria-zirconia composite oxide particles and the inorganic oxide particles other than the ceria-zirconia composite oxide particles as described above can be used as-is.

For each of the thickener, the binder, and the precursor of a catalytic noble metal, the same as a component in the coating liquid for supporting a catalytic noble metal or the coating liquid for surface-localizing a catalytic noble metal may be used after appropriately adjusting the content.

For each of the ceria-zirconia composite oxide particles, the inorganic oxide particles other than the ceria-zirconia composite oxide particles, and the precursor of a catalytic noble metal, the type thereof may be selected and the content thereof may be adjusted according to the composition of the coating layer of the target exhaust gas purification catalytic device.

The coating of the coating liquid for forming a coating layer on the substrate may be carried out by, for example, the first coating method or the second coating method in the same manner as the coating of the coating liquid for surface-localizing a catalytic noble metal.

The coating film is dried, and thereafter baked, as needed, to form a coating layer on the substrate. The drying and baking may be carried out by conventional methods. In order to avoid sintering at high temperature and impairing the rapid response of the absorption and release of oxygen, the ceria-zirconia composite oxide particles in the coating layer may be baked at a temperature of, for example, 700° C. or less, 650° C. or less, 600° C. or less, 550° C. or less, or 500° C. or less. To effectively obtain the effect of baking, the baking temperature may be, for example, 400° C. or greater, 450° C. or greater, 500° C. or greater, or 550° C. or greater. The baking time may be, for example, 30 min to 24 h.

Whether a coating layer is formed on the substrate surface or within the substrate can be selected by appropriately adjusting, for example, the components of the coating liquid for forming the coating layer or the coating conditions.

For example, if the particle sizes of the ceria-zirconia composite oxide particles and the inorganic oxide particles other than the ceria-zirconia composite oxide particles contained in the coating liquid for forming a coating layer are larger than the average pore size of the substrate porous wall, there is a tendency for the coating layer to be formed on the substrate surface;
- if the particle sizes of these particles are smaller than the average pore size of the substrate porous wall, there is a tendency for the coating layer to be formed within the substrate.

If the viscosity of the coating liquid for forming the coating layer is high, there is a tendency for the coating layer to be formed on the substrate surface;
- if the viscosity of the coating liquid for forming the coating layer is low, there is a tendency for the coating layer to be formed within the substrate.

After coating the substrate with the coating liquid for forming the coating layer, if the standby time until baking is long, there is a tendency for the coating layer to be formed within the substrate.

EXAMPLES

The unit of gas concentration in the following Examples is based on volume.
<<Substrate>>
In the following Examples and Comparative Examples, a straight flow-type substrate was used as the substrate. The substrate was a ceria-zirconia based (CZ based) monolith-type honeycomb substrate containing ceria-zirconia composite oxide particles at 21% by weight in terms of the weight of ceria and 25% by weight in terms of the weight of zirconia. The size of the substrate was as follows:
Diameter: 117 mm
Length: 80 mm
Capacity: 860 mL
Cell count: 400 cells/inch$^2$
Cell shape: square
Thickness of porous wall: 120 μm Comparative Example 1

A substrate was immersed for 1 h in an aqueous solution containing 0.602 g (0.70 g/L per L of substrate capacity) metallic palladium equivalent of palladium nitrate and 0.258 g (0.30 g/L per L of substrate capacity) metallic rhodium equivalent of rhodium nitrate. The substrate after immersing was dried and further baked in an electric furnace at 500° C. for 1 h, whereby palladium and rhodium were supported in the porous wall of the substrate, to manufacture the exhaust gas purification catalytic device of Comparative Example 1.

Figure 4:
FIG. 4(a), FIG. 4(b), and FIG. 4(c) are schematic cross-sectional views showing configurations of the exhaust gas purification catalytic device obtained in Comparative Example 1, Example 1, and Example 2, respectively.
Figure 4:
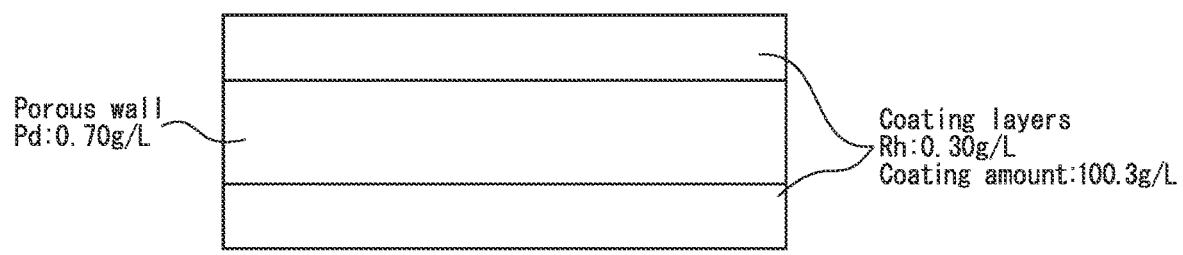
Figure 4:
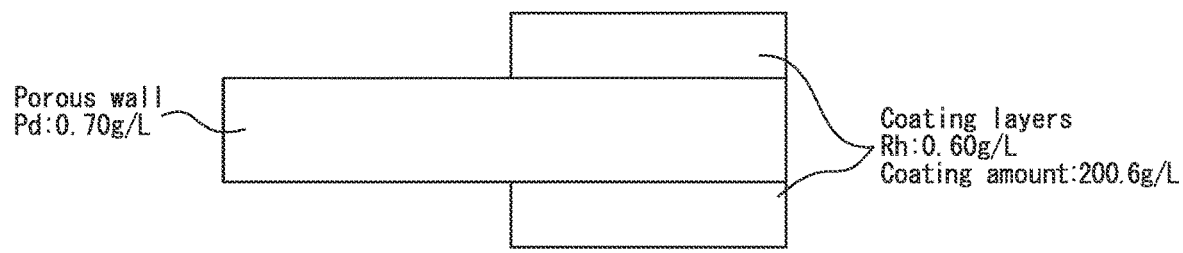
Figure 4:

A schematic cross-sectional view showing a configuration of the exhaust gas purification catalytic device obtained in Comparative Example 1 is shown in FIG. 4($a$).

Example 1

(1) Support of Noble Metal in Substrate Porous Wall
A substrate was immersed for 1 h in an aqueous solution (coating liquid for supporting a catalytic noble metal) containing 0.602 g (0.70 g/L per L of substrate capacity) metallic palladium equivalent of palladium nitrate. The substrate after immersing was dried and further baked in an electric furnace at 500° C. for 1 h, whereby palladium was supported in the porous wall of the substrate.
(2) Manufacture of Exhaust Gas Purification Catalytic Device
(i) Preparation of Coating Liquid for Forming Coating Layer
86.0 g of a material containing a ceria-zirconia composite oxide (100 g/L per L of substrate capacity) was mixed so as to have the same composition as the substrate. To the obtained mixture an aqueous solution containing 0.258 g (0.30 g/L per L of substrate capacity) metallic rhodium equivalent of rhodium nitrate and alumina sol as a binder were added and wet-pulverized, whereby a coating liquid for forming a coating layer was prepared.
(ii) Formation of Coating Layer
On the substrate in which palladium was supported in the porous wall, the entire length of the substrate was coated with the entire amount of the coating liquid for forming a coating layer. The substrate after coating was dried and further baked in an electric furnace at 500° C. for 1 h to form a coating layer on the substrate surface, whereby the exhaust gas purification catalytic device of Example 1 was manufactured.

The coating amount and the rhodium amount of the coating layer of the obtained exhaust gas purification catalytic device per L capacity of a region of the substrate having the coating layer were 100.3 g/L and 0.30 g/L, respectively.

A schematic cross-sectional view showing a configuration of the exhaust gas purification catalytic device obtained in Example 1 is shown in FIG. 4($b$).

Example 2

(1) Support of Noble Metal in Substrate Porous Wall
Palladium was supported in the porous wall of the substrate in the same manner as in Example 1.
(2) Manufacture of Exhaust Gas Purification Catalytic Device
On the substrate in which palladium was supported in the porous wall, a range of 50% of the substrate length from the downstream side of an exhaust gas flow of the substrate was coated with an entire amount of a coating liquid for forming a coating layer, prepared in the same manner as in Example 1. The substrate after coating was dried and further baked in an electric furnace at 500° C. for 1 h to form a coating layer on the substrate surface, whereby the exhaust gas purification catalytic device of Example 2 was manufactured.

The coating amount and the rhodium amount of the coating layer of the obtained exhaust gas purification catalytic device per L capacity of a region of the substrate having the coating layer were 200.6 g/L and 0.60 g/L, respectively.

A schematic cross-sectional view showing a configuration of the exhaust gas purification catalytic device obtained in Example 2 is shown in FIG. 4($c$).
<<Evaluation of OSC Ability>>
The exhaust gas purification catalytic devices obtained in Comparative Example 1 and Examples 1 and 2 above were connected to a gas analyzer manufactured by HORIBA, Ltd., and a pretreated gas (1% of $H_2$+the balance of $N_2$) was circulated at a flow rate of 35 L/min for 5 min at 400° C. Thereafter, the model gases of steps 1 to 7 indicated in Table 1 were flowed continuously and sequentially at each of the two standard testing temperatures of 400° C. and 500° C.

TABLE 1

|  | Step 1 | | Step 2 | | Step 3 | | Step 4 | |
| --- | --- | --- | --- | --- | --- | --- | --- | --- |
| Gas composition | $O_2$ $N_2$ | 1% balance | $N_2$ | 100% | CO $N_2$ | 2% balance | $N_2$ | 100% |
| Time | 200 s | | 120 s | | 200 s | | 120 s | |
| Flow rate | 35 mL/min | | 35 mL/min | | 35 mL/min | | 35 mL/min | |

|  | Step 5 | | Step 6 | Step 7 | |
| --- | --- | --- | --- | --- | --- |
| Gas composition | $O_2$ $N_2$ | 1% balance | $N_2$ 100% | CO $N_2$ | 2% balance |
| Time | 300 s | | 120 s | 600 s | |
| Flow rate | 35 mL/min | | 35 mL/min | 35 mL/min | |

The composition of the gas discharged from each of the exhaust gas purification catalytic devices was evaluated over time. The $CO_2$ emission in step 7 (CO2%) was examined, which was used as an indicator of the OSC ability of each exhaust gas purification catalytic device.

The evaluation results at the testing temperatures of 400° C. and 500° C. are shown in Table 2 and Table 3, respectively. The initial OSC amount is an integrated value of $CO_2$ emissions for 20 s from the start of step 7. The OSC amount is an integrated value of $CO_2$ emissions for 600 s from the start of step 7.

TABLE 2

Evaluation results (400° C.)

|  | Comparative Example 1 | Example 1 | Example 2 |
|---|---|---|---|
| Initial OSC amount ($CO_2$ emission (mL/20 s)) | 0.88 | 1.22 | 1.12 |
| Total OSC amount ($CO_2$ emission (mL/600 s)) | 92 | 110 | 100 |

TABLE 3

Evaluation results (500° C.)

|  | Comparative Example 1 | Example 1 | Example 2 |
|---|---|---|---|
| Initial OSC amount ($CO_2$ emission (mL/20 s)) | 0.85 | 1.24 | 1.12 |
| Total OSC amount ($CO_2$ emission (mL/600 s)) | 100 | 118 | 109 |

Figure 5:
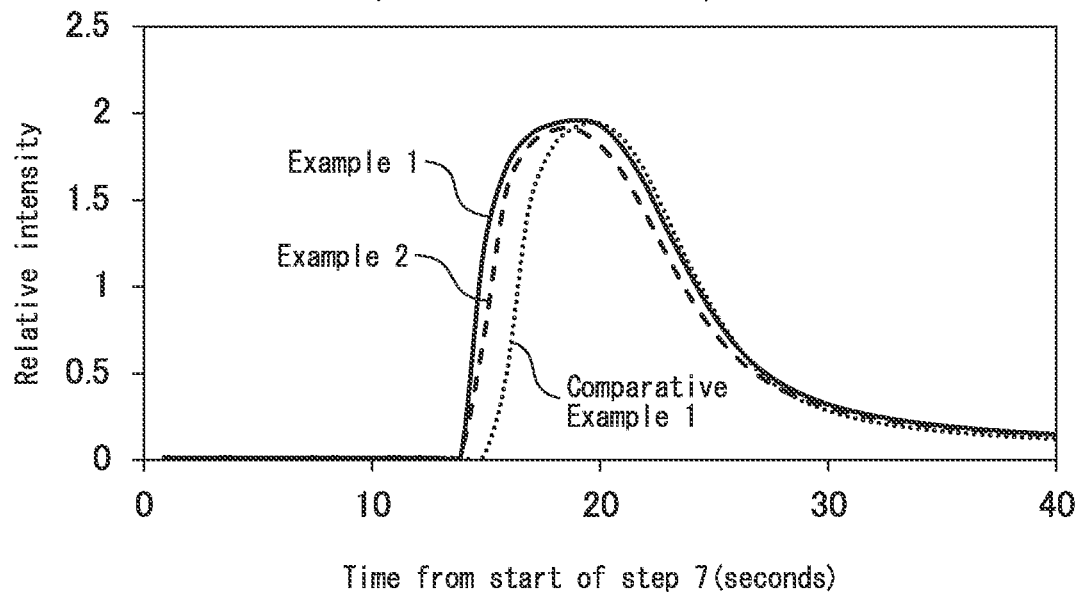
FIG. 5 are graphs showing the changes of $CO_2$ emission over time when the testing temperature is 400° C., in the evaluation of OSC ability of the exhaust gas purification catalytic device in the Examples.
Figure 5:
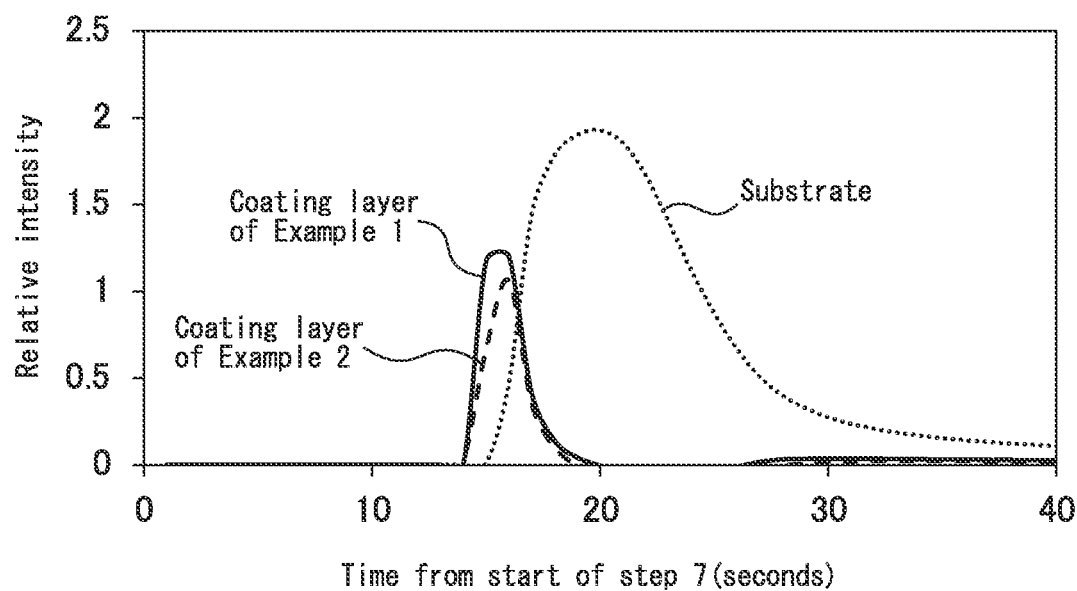
Figure 6:
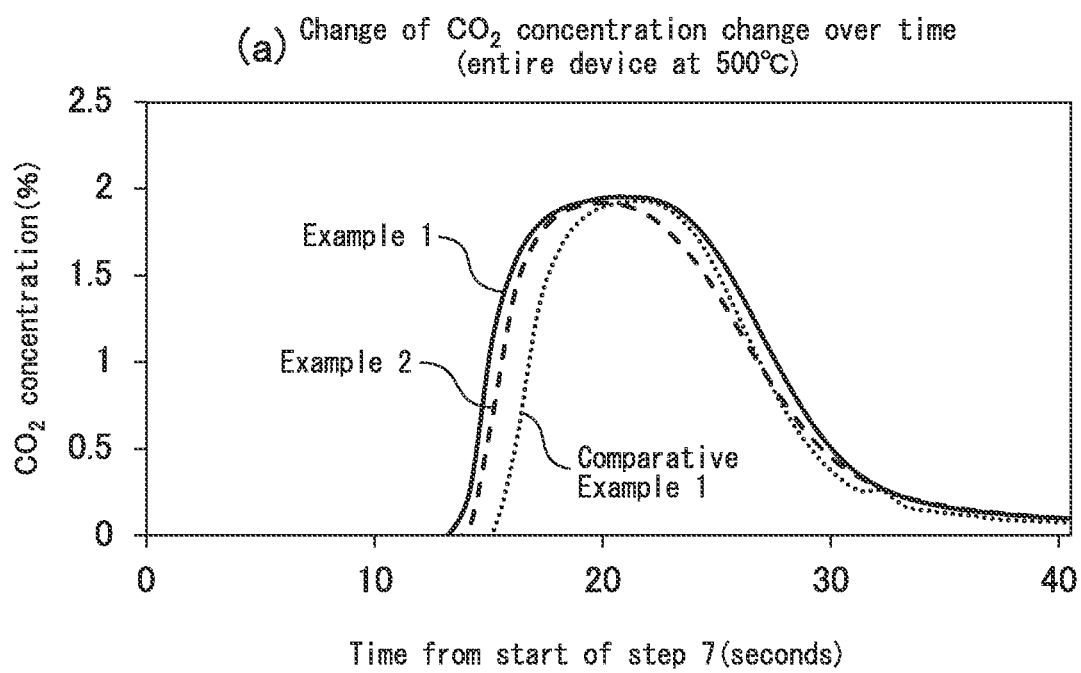
FIG. 6 are graphs showing the changes of $CO_2$ emission over time when the testing temperature is 500° C., in the evaluation of OSC ability of the exhaust gas purification catalytic device in the Examples.
Figure 6:
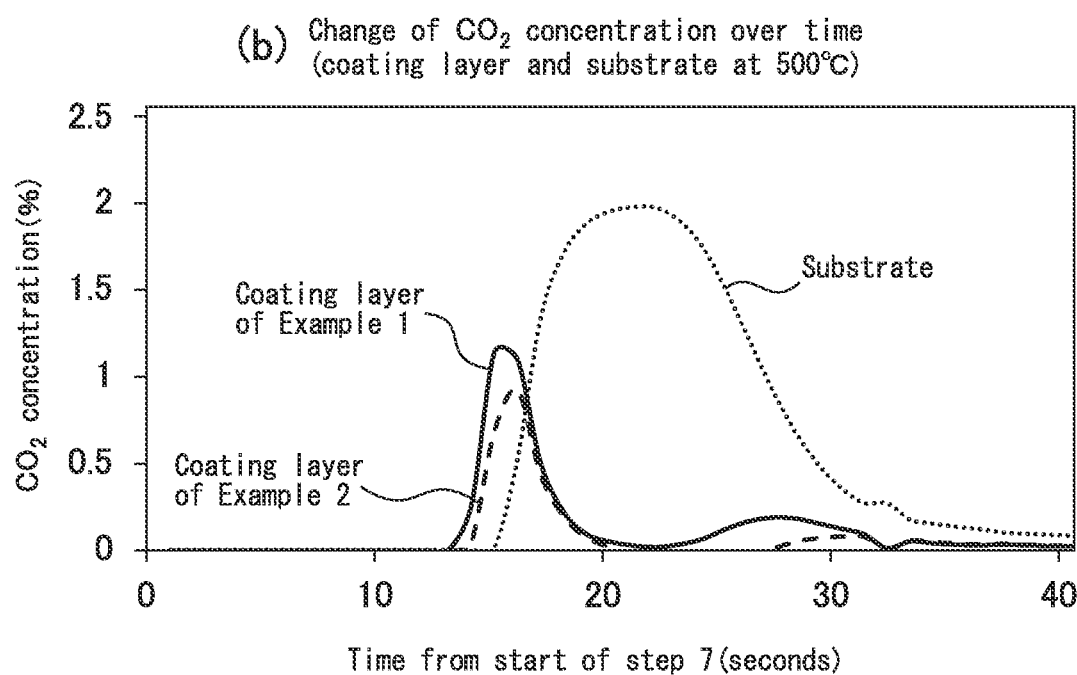

The changes of $CO_2$ emission over time for 40 s from the start of step 7 are shown in FIG. 5 and FIG. 6. FIGS. 5(a) and (b) are graphs at a testing temperature of 400° C. FIGS. 6(a) and (b) are graphs at a testing temperature of 500° C. Each of FIG. 5(a) and FIG. 6(a) is a graph directly showing the change (OSC ability) of $CO_2$ emission over time for 40 s from the start of step 7. Each of FIG. 5(b) and FIG. 6(b) is a graph showing the OSC ability of each catalytic device separated by the contribution of the substrate and the contribution of the coating layer.

According to the results above, it was found that although a substrate containing the OSC material exhibited a certain OSC ability, the initial OSC amount has a certain limit. In the exhaust gas purification catalytic device of Examples 1 and 2, which were provided with a coating layer containing the OSC material on the substrate, both the initial OSC ability and the total OSC ability, particularly the initial OSC ability, were improved. Specifically, with reference to FIG. 5(b) and FIG. 6(b), it was found that the coating layer containing the OSC material contributed to the improvement of the initial OSC amount.

From the foregoing, it is expected that when purifying the exhaust gas of, for example, an automobile under an actual driving environment where fluctuations of, for example, air-fuel ratio and space velocity are expected, the exhaust gas purification catalytic device of the present invention is capable of rapidly and effectively mitigating the fluctuations of the exhaust gas environment and effectively purifying the exhaust gas.

REFERENCE SIGNS LIST 10, 20 substrate
11, 21 porous wall
12, 22 cell
15, 25 coating layer
100, 200 exhaust gas purification catalytic device
CZ ceria-zirconia composite oxide particles
PGM catalytic noble metal

The invention claimed is:

1. An exhaust gas purification catalytic device, comprising
a substrate,
one or more catalytic noble metals supported on the substrate, and
a coating layer on a surface of the substrate, wherein
the substrate comprises a plurality of cells partitioned by a porous wall, and
the substrate and the coating layer each contain ceria-zirconia composite oxide particles,
wherein
the plurality of cells in the substrate penetrate from an upstream end to a downstream end of an exhaust gas flow, and
the coating layer is present in a length of 80% or less of a substrate length from a downstream end of an exhaust gas flow of the substrate.

2. The exhaust gas purification catalytic device according to claim 1, wherein a coating amount of the coating layer per L capacity of a portion of the substrate corresponding to a region having the coating layer is 400 g/L or less.

3. The exhaust gas purification catalytic device according to claim 1, wherein the coating layer contains a catalytic noble metal.

4. The exhaust gas purification catalytic device according to claim 3, wherein the catalytic noble metal contained in the coating layer and the one or more catalytic noble metals supported on the substrate are different catalytic noble metals.

5. The exhaust gas purification catalytic device according to claim 4, wherein the catalytic noble metal contained in the coating layer is rhodium and the one or more catalytic noble metals supported on the substrate is one or more selected from platinum and palladium.

6. The exhaust gas purification catalytic device according to claim 1, wherein for one noble metal, among the one or more catalytic noble metals supported on the substrate, a depth of supporting 50% by mass of a noble metal is less than 50% of a distance from a surface of the porous wall to a center within the porous wall, wherein
the depth of supporting 50% by mass of the noble metal is a depth at which 50% by mass of the specific noble metal is supported, based on an amount of the specific noble metal supported from the surface of the porous wall to the center within the porous wall.

7. An exhaust gas purification method which uses the exhaust gas purification catalytic device according to claim 1,
wherein the exhaust gas purification catalyst device is arranged so that the upstream end of the substrate faces an exhaust gas flow upstream side.

* * * * *